(12) United States Patent
Tolmei

(10) Patent No.: US 7,650,236 B2
(45) Date of Patent: Jan. 19, 2010

(54) MEANS, METHODS, AND APPARATUS TO REDUCE THE POSSIBILITY OF A MOTOR VEHICLE ENTERING A FREEWAY RAMP IN THE WRONG DIRECTION OF TRAVEL—TOWARDS ONCOMING TRAFFIC

(76) Inventor: Ron Tolmei, 5258 Grasswood Ct., Concord, CA (US) 94521

( * ) Notice: Subject to any disclaimer, the term of this patent is extended or adjusted under 35 U.S.C. 154(b) by 655 days.

(21) Appl. No.: 11/318,315

(22) Filed: Dec. 23, 2005

(65) Prior Publication Data
US 2007/0150183 A1 Jun. 28, 2007

(51) Int. Cl.
*G01C 21/30* (2006.01)
(52) U.S. Cl. ........................ 701/209; 701/213; 701/117; 701/301
(58) Field of Classification Search ......... 701/707–213, 701/300, 301, 117, 36; 340/989
See application file for complete search history.

(56) References Cited

U.S. PATENT DOCUMENTS 6,166,627 A * 12/2000 Reeley ................... 340/426.25
7,397,929 B2 * 7/2008 Nichani et al. ............... 382/103
7,421,334 B2 * 9/2008 Dahlgren et al. ............. 701/117

* cited by examiner

*Primary Examiner*—Richard M. Camby
(74) *Attorney, Agent, or Firm*—D. Benjamin Borson; Borson Law Group, PC

(57) ABSTRACT

A system used to reduce the possibly of a vehicle entering a freeway ramp in the wrong direction of travel, towards oncoming traffic, is disclosed. The preferred system is comprised of equipment used in conjunction with orbiting satellite transceivers with receivers, such as Global Positioning Systems (GPS) or OnStar™ by General Motors, housed in a vehicle and having the ability in real time to compute the receiver's, and consequently the vehicle's, longitude, latitude, and direction of travel. These devices in collaboration with a controller and freeway mounted mirrors constitute a timely, cost-effective, realizable, and simple means to reduce the possibility of entering a freeway ramp in the wrong direction of travel.

16 Claims, 2 Drawing Sheets

MEANS, METHODS, AND APPARATUS TO REDUCE THE POSSIBILITY OF A MOTOR VEHICLE ENTERING A FREEWAY RAMP IN THE WRONG DIRECTION OF TRAVEL—TOWARDS ONCOMING TRAFFIC

CROSS-REFERENCE TO RELATED APPLICATIONS

References Cited

U.S. Patent Documents

| | | | |
|---|---|---|---|
| 5,515,283 | May, 1996 | Desai, et al. | 701/200. |
| 4,133,140 | Jan. 9, 1979 | Berard, et al. | 49/263. |
| 4,250,646 | Feb. 17, 1981 | Trachtenberg | 40/582. |
| 6,684,155 | Jan. 27, 2004 | Chen, et al. | 701/117 |
| 6,671,619 | Dec. 30, 2003 | Kusano, et al. | 701/209 |
| 6,665,610 | Dec. 16, 2003 | Correia, et al. | 701/209 |
| 6,374,183 | Apr. 16, 2002 | Oshida, et al. | 701/211 |
| 5,974,357 | Oct. 26, 1999 | Poonsaengsathit, et al. | 701/210 |
| 5,925,090 | Jul. 20, 1999 | Poonsaengsathit, et al | 701/211 |

BACKGROUND OF THE INVENTION

1. Field of the Invention

The present invention relates to cost-effective, timely, and realizable means to reduce the possibility of a motor vehicle entering a freeway ramp in the wrong direction of travel—towards oncoming traffic!

2. Discussion of Background

Motor vehicles entering freeway ramps in the wrong direction of travel have long been a cause of injury or death. Worse, these incidents almost always involve multiple vehicle collisions owing to the domino effect. A statistically insignificant number of these incidents are caused by unanticipated, and often unavoidable, weather conditions such as fog, rain or snow with some accidents being attributed to elderly drivers. However, there is no doubt that the major and predominate cause of vehicle accidents are due too the use of alcohol or drugs. To date there have been numerous patents issued and suggestions submitted in an attempt to resolve the "Wrong Direction" problem by various means. The vast majority of these involve implementation of physical obstacles at freeway ramps that are configured with equipment to detect the direction of vehicle travel and when appropriate activate mechanical obstacles. Alternately attempts to stop vehicles, currently in use by some law enforcement agencies, is to destroy a vehicles electrical system with high intensity electromagnetic pulses (EMP) that, although causing irreparable damage, causes the vehicle to stop. Major obstacles in implementing any of these solutions are: their complexity, construction costs, maintenance, the large number of sites involved, and time. It is therefore unlikely that even a small fraction of these systems will be implemented—at least not in the near future.

Without reservation, time is the most important issue in the implementation of any system to reduce traffic fatalities as each year literally thousands of lives are lost. We need a timely and realizable solution now—not five years from now.

Therefore as exemplified, the most important considerations in developing a system to reduce the possibility of entering a freeway ramp in the wrong direction of travel are: the ability to be implemented in a timely cost-effective manner and simplicity of installation—all of which this present invention uniquely satisfies.

BRIEF SUMMARY OF THE INVENTION

Accordingly with the major aspects of the problem, already briefly recited, the present invention is a system to reduce the possibility of a vehicle entering a freeway ramp in the wrong direction of travel. The system is comprised of equipment used in conjunction with orbiting satellite transceivers with receivers, such as Global Positioning Systems (GPS) or OnStar™ by General Motors, housed in a vehicle and having the ability in real time to compute the receiver's, and consequently the vehicle's, longitude, latitude, and direction of travel. These devices in collaboration with freeway mounted mirrors constitute a timely, cost-effective, realizable, and simple means to reduce the possibility of entering a freeway ramp in the wrong direction of travel. Two wayside mounted mirrors, one mirror adjacent to each side of the freeway ramp, are positioned such that a vehicle's driver, only when traveling in the wrong direction of travel, sees his vehicle and headlights upon entering the freeway exit. The on board vehicle equipment, with minor software and hardware modifications, is programmed to alert, annunciate, and temporarily disable the vehicles ignition system whenever the vehicle is entering a "Wrong Way" Do Not Enter freeway ramp and thereby halt the vehicle. A momentary action switch to enable restarting the vehicle is provided that must be manually positioned to sustain ignition until the vehicle is put into reverse. Once the vehicle is in reverse the driver can back out of the ramp until the system detects he is no longer in the area of concern and allows him to proceed in forward direction.

It is important to note that both the location systems and the wayside mirrors meet the cost and time to implementation as they both are off-the-shelf technologies. Construction costs for mirrors to be installed are no more than a stop sign, do not require concrete pilings as the mirrors are light weight, and can be integrated with existing "Wrong Way" or "Do not Enter" signs currently installed. Other features and their advantages will be apparent to those skilled in the art of collision avoidance from a careful reading of the Detailed Description of Preferred Embodiments accompanied by the following drawings.

DETAILED DESCRIPTION OF THE INVENTION

The present invention is a system comprised of satellite receivers, with associated control electronics, and mirrors to reduce the possibility of a motor vehicle unintentionally entering a freeway ramp in the wrong direction of travel. Currently satellite receivers with GPS, visual, audible and even bidirectional communications capabilities are commercially available with costs ranging from a few hundred dollars to a few thousand dollars. These systems are already providing directions and site dependant information to police, fire, emergency personnel, and the general public on a no-fee basis and therefore not only cost-effective but immediately available. Further, no long term research and development, or implementation, programs are necessary as these systems already use proven technology to locate a specified location almost anywhere on earth. What this invention capitalizes on is that technology in reverse. That is, we know where we are going—but is it safe? Further, this invention capitalizes on human instinct and response to visual stimuli from mirrors as a: "what you see is what you get" collision avoidance system. For simplicity in this description it will be assumed that freeway is synonymous with highway or roadway and the present system would operate in the same fashion as described.

Figure 1:
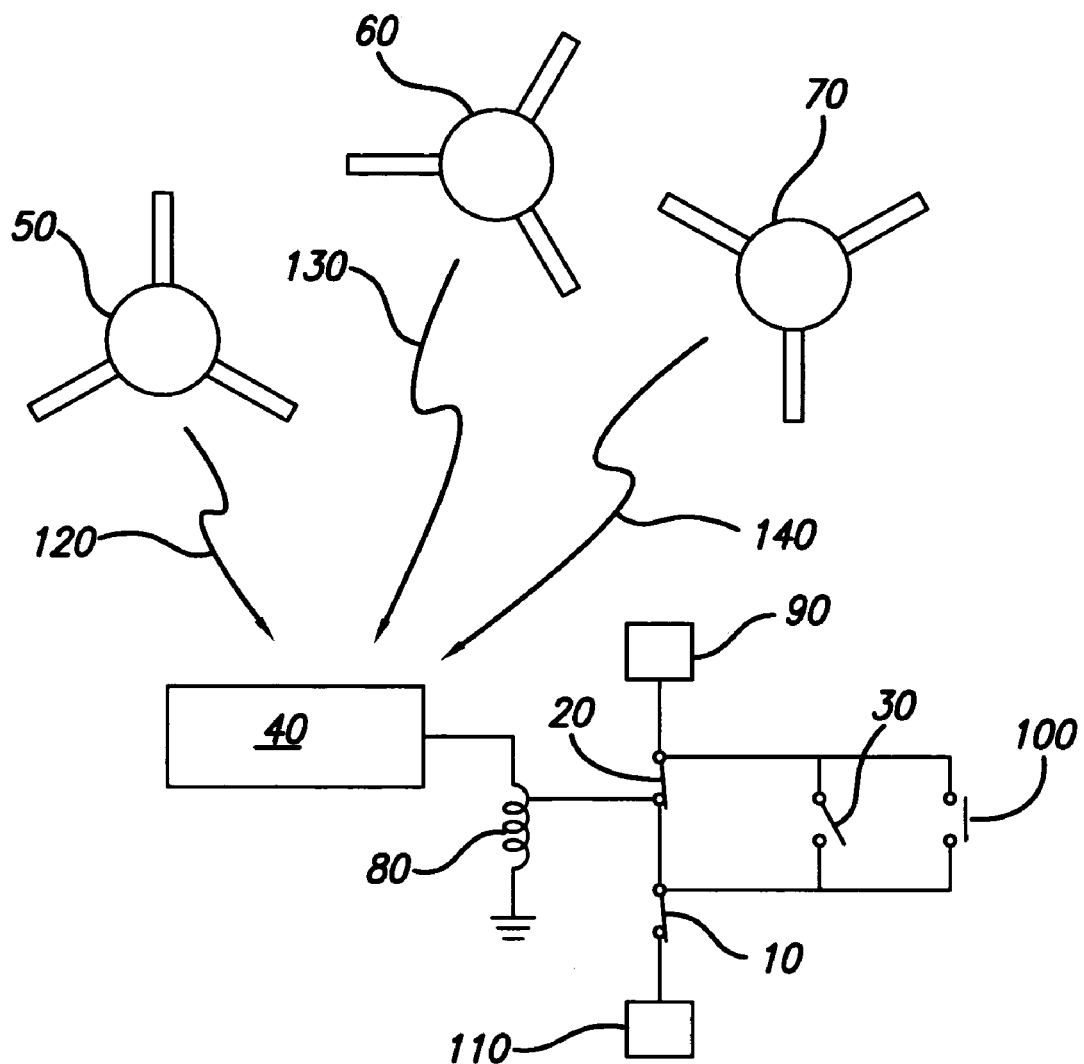
FIG. 1 is a block diagram of the electronic control system using satellite technology to reduce the possibility of a motor vehicle unintentionally entering a freeway ramp in the wrong direction of travel according to a preferred embodiment of the present invention.

FIG. 1 shows an overall systems view of the electronic control system to disable a vehicles ignition system by using communication satellites 50, 60 and 70 that are transmitting signals 120, 130, and 140 to a satellite receiver 40 that has the capability to compute, by the differences in propagation time, the longitude, latitude, and direction of travel of receiver 40 that is housed in the motor vehicle. After receiver 40 computes its longitude, latitude and direction of travel it is compared with previously entered locations known to be freeway exit only ramps and if a match energizes relay 80 opening contact 20. Contact 20 in its normal closed state applies power from vehicle power supply 90 which in turn supplies power to the vehicles ignition system 110 through normally closed ignition switch contact 10.

When contact 20 of relay 80 is opened with switch 30 open, (a switch only closed when the subject vehicle's transmission is in reverse) and momentary switch 100 (used only to enable starting the vehicle when contact 20 and switch 30 are in the open position) power to the vehicles ignition system is removed and the subject vehicle stops.

As long as receiver 40 continues to decode the received signals 120, 130, and 140 received from satellites 50, 60 and 70 as exit only ramp locations, and knowing the vehicle's past direction of travel, energizing relay 80 and opening contacts 20 the vehicle can not be started. In order to enable starting the vehicle the driver must first hold down momentary switch 100 to enable starting the vehicle and then, while continuing to hold down momentary switch 100, after starting the vehicle, put the vehicle's transmission in reverse thereby automatically closing the vehicle's backup light switch 30 which as long as in reverse will sustain power, allowing momentary switch 100 to be released, through the vehicles ignition switch 10 supplying power to the vehicles ignition system 110.

Figure 2:
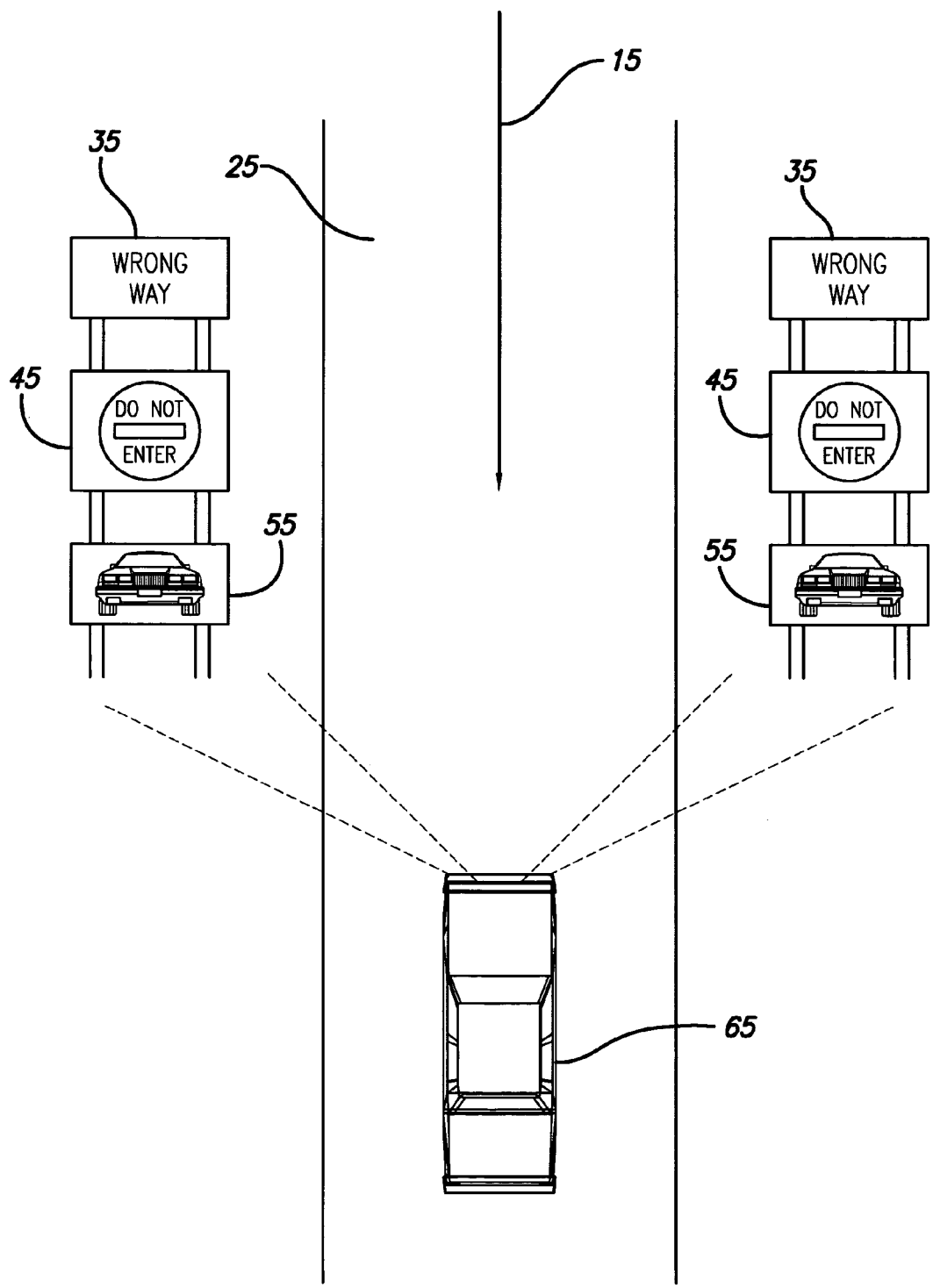
FIG. 2 is a pictorial of the mechanical configuration to visually reduce the possibility of a motor vehicle unintentionally entering a freeway ramp in the wrong direction of travel according to a preferred embodiment of the present invention.

Once the vehicle has backed into a location that receiver 40 recognizes as a safe location receiver 40 will de-energize relay 80 causing contact 20 to close enabling power from vehicle power supply 90 to be applied through the vehicles normally closed ignition switch contact 10 applying power to the vehicle's ignition system 110 allowing the vehicle to proceed in the forward direction of travel. FIG. 2 illustrates the preferred embodiment of mirrors 55 in proximately to existing traffic control signs 35 and 45 as located on freeway 25 to optically reflect, and thereby discourage entry, vehicle 65 from entering the ramp of freeway 25 in the direction of oncoming traffic 15.

It is readily apparent to those skilled in the art collision avoidance and traffic control from reading the foregoing that many substitutions and modifications may be made to the preferred embodiments described without departing from the spirit and scope of the present invention.

What is claimed is:

1. A system to reduce the possibility of a vehicle entering a freeway ramp in the wrong direction of travel, towards oncoming traffic, and comprised of a navigation receiver, computer, electromechanical controls, comprising:

a satellite receiver, with or without bidirectional communications capability, housed in a motor vehicle with global positioning capabilities to compute, display and annunciate, its longitude, latitude and direction of travel in conjunction with a mirror being positioned in proximity to a freeway access ramp so positioned as to reflect an oncoming vehicle, and its headlights, such that the vehicle's driver sees his vehicle as an oncoming vehicle, stops, and reverses his direction of travel thereby avoiding collision;

further comprising an electromechanical or solid state controller to nondestructively disable a vehicle ignition system when a satellite receiver computes and detects that the receiver's and therefore vehicle's, location and direction of travel is such that the vehicle is entering, or about to enter, a freeway ramp in the wrong direction of travel.

2. The system of claim 1, wherein controls of said controller are switches and relay contacts that provide a means to disable the vehicle's ignition system, bypass the ignition disabling contacts when the vehicle's transmission is in reverse, and the momentary, or timed delayed, switch to enable starting the vehicle when disabled by ignition disabling contacts enabled by the satellite receiver's control logic.

3. The system of claim 1, wherein said mirror has a wavelength and having an optical, infrared, laser, or ultraviolet reflective characteristics implemented in a flat, spherical, parabolic, ellipsoidal, surface, cylindrical, prism, or beam-splitting manner or diffraction grating and being composed of metal, glass, plastic or coated with a material to reflect, distort or absorb an image.

4. The system of claim 1, wherein the satellite receiver comprises or is compatible with global positing systems (GPS) or OnStar™ devices having a graphic display, visual and audible annunciation with or without bidirectional communications capabilities and an external interface.

5. The system of claim 1, wherein said mirror, a reflector, or a radiation emitting device is used with a freeway entrance or exit sign indicating "Wrong Way" or "Do Not Enter" of any wavelength and having any optical, infrared, laser, or ultraviolet reflective characteristics implemented in a flat, spherical, parabolic, ellipsoidal, surface, cylindrical, prism, or beam-splitting manner or diffraction grating and being composed of metal, glass, plastic or coated with a material to reflect, distort or absorb an image at any wavelength.

6. The system of claim 1, wherein said satellite receiver is comprised of or is compatible with storage medium using a magnetic, optical, infrared or solid state device such that stored information retained in a medium is used to reconstruct or process information either with or without the use of bidirectional communications capabilities or an external interface.

7. The system as recited in claim 1, wherein said satellite receiver is comprised of or compatible with a video camera or recorder using, magnetic, optical, infrared or solid state medium such that stored information retained in said medium may be used to reconstruct or process information either with or without the use of bidirectional communications capabilities or an external interface.

8. The system as recited in claim 1, wherein said controller or computer is comprised of or compatible with a video camera, recorder or storage device such that stored information retained in a storage medium may be used to reconstruct or process information.

9. A system, comprising:
a global positioning device in a motor vehicle;
said device having the capability to compute its longitude, latitude and direction of travel;
a memory device having:
a previously entered location of a freeway exit only ramp; and
instructions to compare said location of freeway exit only ramp with the vehicle's longitude, latitude and direction of travel;
a processor to implement said instructions;
a disabler to disable an ignition system of said vehicle when the processor identifies that a location of a freeway exit only ramp and the vehicle's longitude, latitude and direction of travel are sufficiently close as to produce a likelihood of a hazard;
an alerting device that is activated when said hazard is identified.

10. The system of claim 9, wherein controls of said disabler comprise a disabler switch being in either a closed position or in an open position wherein said switch is in said open position to disable said ignition system when said processor determines presence of the hazard.

11. The system of claim 10, wherein said controls further comprises a momentary override switch, wherein said override switch is in a closed position to override the disabler switch and thereby permit said vehicle to be driven.

12. The system of claim 10, wherein said controls further comprises a bypass switch, wherein said bypass switch is in said closed position to bypass the disabler switch when a transmission of said vehicle is in reverse.

13. The system of claim 9, wherein said alerting device is adapted to provide an auditory or visual warning to a driver.

14. The system of claim 9, wherein said memory device comprises a storage medium selected from the group consisting of: magnetic, optical, infrared and solid state devices.

15. The system of claim 9, wherein said global positioning device comprises a video camera or recorder using a storage medium selected from the group consisting of: magnetic, optical, infrared and solid state technology, wherein stored information retained in said medium maybe used to reconstruct or process information either with or without the use of bidirectional communications capabilities or an external interface.

16. The system of claim 9, wherein said processor comprises a video camera, recorder or storage device wherein stored information retained in a medium may be used to reconstruct or process information.

* * * * *

UNITED STATES PATENT AND TRADEMARK OFFICE
CERTIFICATE OF CORRECTION

PATENT NO.      : 7,650,236 B2                                            Page 1 of 1
APPLICATION NO. : 11/318315
DATED           : January 19, 2010
INVENTOR(S)     : Ron Tolmei It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this

Twenty-third Day of November, 2010

David J. Kappos
*Director of the United States Patent and Trademark Office*